UNITED STATES PATENT OFFICE.

JOHN WILLIAM BLAGDEN, OF HEIDELBERG, GERMANY, ASSIGNOR TO C. F. BOEHRINGER & SOEHNE, OF MANNHEIM-WALDHOF, GERMANY, A FIRM.

ART OF HYDROGENATING ORGANIC SUBSTANCES.

1,239,867.  Specification of Letters Patent.  Patented Sept. 11, 1917.

No Drawing.  Application filed October 8, 1914. Serial No. 865,679.

*To all whom it may concern:*

Be it known that I, JOHN WILLIAM BLAGDEN, citizen of the British Empire, residing at Heidelberg, Grand Duchy of Baden, Germany, have invented certain new and useful Improvements in Art of Hydrogenating Organic Substances; and I do hereby declare the following to be a full, clear, and exact description of the invention, such as will enable others skilled in the art to which it appertains to make and use the same.

The present invention relates to improvements in the hydrogenation of organic substances.

The research work of Sabatier and his collaborators on the subject of catalytic hydrogenation, begun about the year 1900 and added to at intervals since, introduced a general method for the hydrogenation and reduction of organic substances in the vaporized state. As is known Sabatier's method consisted, and consists, in passing the vapor of the substance to be hydrogenated or reduced together with hydrogen gas over finely divided nickel, cobalt, etc., at a fairly high temperature (say 150-300°) according to the nature of the substance to be treated. In one special case, that of the glycerids of the fatty acids, it has been found possible to carry out the reaction in the liquid fat at a high temperature (180-200° C.), or to treat the substance in the form of a spray, likewise at a high temperature. The use of these cheap catalyzers nickel, cobalt, etc., was therefore practically confined to the case of the hydrogenation of substances which could be brought into the gaseous state and would stand a high tempertaure.

In the course of my experiments I have, however, made the remarkable discovery that the catalytic action of nickel, cobalt, etc., in assisting the hydrogenation and reduction of substances also manifests itself in aqueous and alcoholic solutions at low temperatures. As a consequence I am able, using nickel, as a catalyzer, to hydrogenate substances which are, for instance, non-volatile, or decompose on heating, by bringing them in some form (say as salt, base, etc.) into aqueous or alcoholic solution, adding the catalyst to the solution and treating the whole with hydrogen. When the reaction is completed the hydrogenated solution may be decanted from the catalyst which settles at the bottom and fresh solution added whereupon the reaction can be repeated. It is perhaps not remarkable that experiments of this kind have not been attempted before having regard to the fact that these finely divided base metals are so active that one would expect them to decompose water and thus become inactive.

The advantages gained by the new method are manifold; in the first place, the method is a cheap one and therefore preferable to such that employ the noble metals as catalysts. In the second place, almost every unsaturated and reducible substance can now be treated at a low temperature, as it is nearly always possible to dissolve it in water or an alcohol, be it the substance itself or in the form of salt, etc.

As a catalyst nickel has proved the most serviceable. It should be pointed out that by "nickel catalyst" is meant the more or less pyrophorous metal obtained by reducing nickel oxid in hydrogen gas at a comparatively low temperature. Scientists are not yet agreed whether the catalytic action is to be assigned to the metal, or to a hydrid of the metal or in some cases perhaps to a suboxid of the metal. It is a fact that the catalysts so obtained always retain hydrogen and frequently still contain small quantities of oxygen. By the term "finely divided metallic catalysts of the nickel group" I mean the substances obtained as above which vary slightly in their composition according to the conditions of their preparation.

In the claims I use the term hydrogenation, in accordance with the custom of Sabatier to include reduction.

In the following examples the mode of carrying out the new reaction is outlined.

Example 1.

To a solution of 12.2 grams of quinin hydrochlorid in 200 c. c. of water, about 1 gram of nickel catalyst are added, and the mixture agitated at a temperature of 30° with hydrogen under a pressure of 2½ atmospheres. Hydrogenation is completed after the lapse of half an hour. About 870 c. c. of gas, measured at normal pressure, are absorbed, which is the amount theoretically required for the formation of hydroquinin.

Example 2.

10 grams of morphin are dissolved in 100 c. c. of water and 3¼ c. c. of concentrated hydrochloric acid, about 1 gram of a nickel catalyst is added, and the solution agitated with hydrogen at a temperature of 18° under a pressure of about 1 atmosphere. The absorption of the hydrogen is completed in about 40 minutes.

Example 3.

5 grams of cinnamyl cocain are dissolved in a mixture of 1.13 c. c. of concentrated hydrochloric acid and 180 c. c. water, and 1 gram of catalyst is added. The mixture is treated in the same manner as shown in Example 1. Hydrogenation proceeds smoothly and is completed in 20 minutes. Hydrocinnamyl cocain is an oily substance resistant to permanganate.

Example 4.

5 grams of cinnamic acid are dissolved in a mixture of 67 c. c. of normal sodium hydrate and 60 c. c. of water, nickel catalyst added the whole treated with hydrogen in the manner described above. Hydrogenation proceeds somewhat slower than in the preceding examples but is completed in 2 hours. On acidulating the mixture the hydrocinnamic acid formed separates out at first in the oily state.

Example 5.

10 grams of amino-aceto-nitrile sulfate are dissolved in 100 c. c. of water and the catalyst added. The reaction is carried out as in the foregoing examples, and is completed in about 2½ hours. 200 c. c. of hydrogen measured at atmospheric pressure are absorbed, this being the quantity necessary for the production of ethylene diamin.

Example 6.

12.2 grams of quinin mono-hydrochlorid are dissolved in 200 c. c. of ethyl alcohol, about 1 gram of a nickel catalyst is added, and the mixture is treated at a temperature of about 30° with hydrogen at a pressure of about two atmospheres. The quantity of hydrogen necessary for forming the bihydroquinin is gradually absorbed, and hydrogenation is completed in 1¾ hours.

Example 7.

12.2 grams of quinin mono-hydrochlorid are dissolved in 200 c. c. of pure methyl alcohol and treated with hydrogen after adding a small quantity of a catalyst as shown in Example 1. The reaction is at an end after about 2 hours.

Example 8.

5 grams of cinnamyl cocain and 1.1 gram of concentrated hydrochloric acid are dissolved in 200 c. c. of ethyl alcohol and after adding a certain quantity of a catalytic substance as shown in Example 1 is treated with hydrogen. The reaction lasts some hours.

Example 9.

5 grams acetoxim are dissolved in 100 grams of water and a small quantity of nickel catalyst is added. The mixture is then treated as in the foregoing examples with hydrogen at a pressure of about 2½ atmospheres and a temperature of say 30° C. The reaction is at an end after 2 to 3 hours. The product obtained is isopropylamin.

What I claim, and desire to secure by Letters Patent, is:

1. The method of hydrogenating alkaloids consisting in treating an alkaloidal compound in the presence of an indifferent liquor with molecular hydrogen in the presence of a catalyst of the nickel group.

2. The method of hydrogenating alkaloids consisting in treating an alkaloidal compound dissolved in an indifferent liquor containing a substance having a hydroxylic group with molecular hydrogen in the presence of a catalyst of the nickel group.

3. The method of hydrogenating alkaloids consisting in treating an alkaloidal compound dissolved in an indifferent liquor containing a substance having a hydroxylic group with molecular hydrogen in the presence of a catalyst of the nickel group under pressure while agitating the mixture.

4. The method of hydrogenating alkaloids consisting in treating their salts in aqueous solution with molecular hydrogen in the presence of a nickel catalyst under pressure while agitating the mixture.

5. The method of hydrogenating quinin, which consists in treating an indifferent liquor containing a substance comprising the quinin molecule with molecular hydrogen in the presence of a catalyst of the nickel group.

6. The method of hydrogenating quinin which consists in treating a substance comprising the quinin molecule in an indifferent solution containing a substance having a hydroxylic group, with molecular hydrogen in the presence of a catalyst of the nickel group.

7. The method of hydrogenating quinin consisting in treating a quinin salt in aqueous solution with molecular hydrogen in the presence of a nickel catalyst under pressure while agitating the mixture.

8. The method of hydrogenating quinin which consists in treating an indifferent liquor containing quinin hydrochlorate with molecular hydrogen in the presence of a catalyst of the nickel group.

In testimony whereof I hereunto affix my signature in the presence of two witnesses.

JOHN WILLIAM BLAGDEN.

Witnesses:
H. MERLE COCHRAN,
HANS WINKLER.